Patented Dec. 29, 1925.

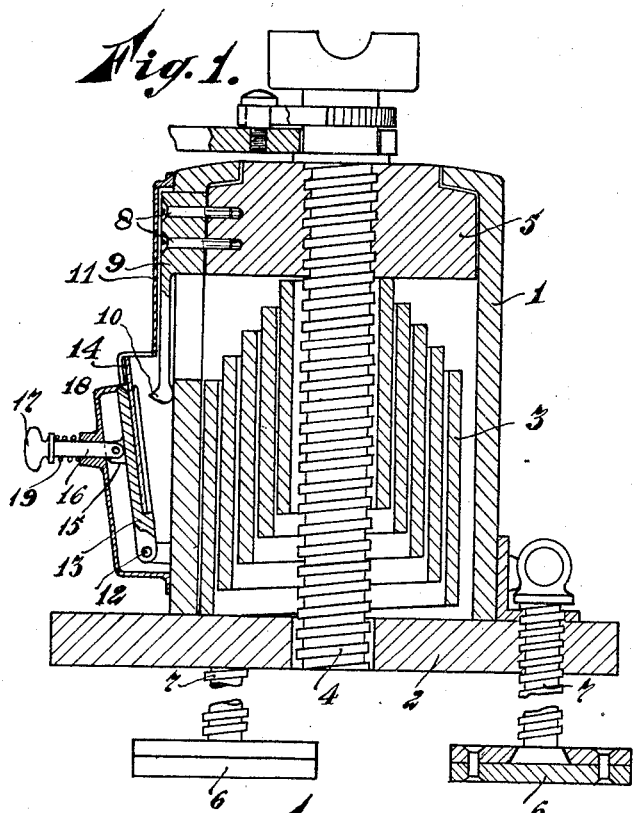
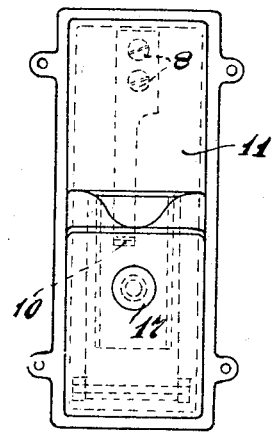

1,567,308

UNITED STATES PATENT OFFICE.

ABRAHAM VAN L. VAN DEN HEUVELL, OF ZWOLLE, NETHERLANDS.

WEIGHING JACK FOR DETERMINING THE WHEEL PRESSURE OF VEHICLES.

Application filed November 17, 1922. Serial No. 601,640.

*To all whom it may concern:*

Be it known that I, ABRAHAM VAN LINDEN VAN DEN HEUVELL, engineer, a subject of the Queen of the Netherlands, residing at Zwolle, the Netherlands, have invented certain new and useful Improvements in Weighing Jacks for Determining the Wheel Pressure of Vehicles, of which the following is a specification.

The present invention relates to improvements in weighing jacks for determining the wheel pressure of vehicles in which the weight of the vehicle, when being lifted, will bear on a spring and the degree of compression caused thereby is indicated by the deflection of a pointer, which deflection can be read on a scale. In order to determine the wheel pressure as accurately as possible, these weighing jacks are placed in close proximity of the wheel underneath the shaft or under the wheel hub projecting outside the wheel. All vehicles, however, are not provided with a wheel hub projecting to such an extent, that the latter mode of mounting becomes possible, while further the danger of damaging the hub or the wheel in this case is rather great. In most cases the wheel can be lifted solely by lifting the shaft. Besides the fact that a convenient place for the jack under the vehicle is not always available and that, by reason of the small space available, the lifting operation gives rise to difficulties, the reading of the weight on the scale with pointer is often very difficult, if not even impossible.

Moreover when the apparatus is used for ascertaining a violation of the law as regards the admissible wheel pressure on the road, a difference of opinion between the road officials and the road user cannot be solved for the reason that the measurement is not determined in an authentic manner. There can only be relied on the statements of both parties, whereas moreover for the reasons already mentioned above, it is not at all certain whether they are in a position to effect such a reading.

The invention has for its object to remove these disadvantages by constructing the apparatus in such a manner that the measurement can be registered by means of the apparatus itself at the moment of measuring.

The invention consists in this that the portion of the apparatus, which is moved by the compression of the spring, is provided with a member having one or more projections, the said member being adapted to travel over a certain distance dependent upon the degree of compression, while opposite the end of this member a device is arranged by means of which a card, plate or the like introduced therein may be pressed against the end of the said member in such a manner that on the card, plate or the like a mark is obtained indicating the result of the weighing.

The device for impressing a mark on a card or the like according to the invention preferably consists of a chamber provided on the stationary portion of the weighing jack, the said chamber containing a slotted die rotatable about an axis by means of which die the card or the like introduced into the chamber can be pressed against the end of the indicating member.

It will be clear that the position of the card on which the mark is made by means of the indicating member is dependent upon the degree of compression of the spring and consequently also upon the heaviness of the weight bearing on this jack.

The device may also be constructed in other ways differing from the embodiment above described. For instance a slotted plate may be used and its movement to the projection be obtained by a displacement perpendicular to the spring movement.

Embodiments are also possible in which the card remains stationary and the end of the indicating member is pressed on the card.

In order that the indicating member may impress a clearly visible mark, it is desirable to provide the said member with a pointed projection or a knife edge. The indicating member may also be provided with more than one single projection so that e. g. according to the displacement of this member more marks are impressed on the card, which marks may be different and show certain figures, characters or numbers, indicating the weight.

The accompanying drawings illustrate the invention by way of example.

Fig. 1 is a vertical section of a weighing jack, and

Fig. 2 is a separate elevation of the chamber containing the die.

The apparatus consists of a casing 1 with a base plate 2. On this base plate 2 bears a strong buffer spring 3. Within the coils of the spring a screw spindle 4 passing through a nut 5 is arranged, which nut is slidable up and down in the casing 1 and is guided by the latter. The weight of the nut and screw spindle which latter is provided with a ratchet, is directly taken up by the spring. The whole is supported by three feet 6 at the lower end of screws 7, screwed into the baseplate 2.

Attached to the nut 5 by means of screws 8 is a downwardly projecting indicating member 9, protruding through an opening in the casing 1, the lower end of the said member being displaced downwardly along the closed portion of the wall of the casing 1 when the spring is compressed and the nut 5 is moved downwardly. The lower end of the member 9 is so shaped that it bears against the wall of the casing, while at the opposite end it is provided with a projection 10 having a knife shaped end.

Secured to a fitting surface of the casing 1 at the side at which the projection 10 is provided, is a cover 11 (see also Fig. 2) covering the member at the upper side, while the lower portion, containing the projection 10 in all positions, is enlarged to a chamber. Within this space and near the bottom a shaft 12 is attached in two lugs of the casing. This shaft serves as a fulcrum for a die plate 13 provided with a slot, the wall of which at the side of the casing 1 is omitted with the exception of two edges at either side. In this slot fits a card 14 as shown on the drawing.

At the rear side the die plate 13 is provided with a hook 14. In the wall of the chamber a horizontal rod 16 is slidable in horizontal direction, this rod having at the outer end projecting outside the cover a knob 17 while the other end lying at the inner side of the cover is provided with a slot and a cross pin 18, which pin is engaged by a hook 15 fitting in the slot. Between knob and cover a coiled spring 19 is arranged, retaining the rod and also the plate 13 in the position illustrated.

The upper wall of the lower portion of the chamber is made in stepped formation in such a manner that the lowermost step forms an abutment or stop for the plate 13, while the uppermost step offers space for the portion of the card 14 projecting above the plate 13 when the plate is moved. The horizontal and vertical surface of the uppermost step are partially broken away, which appears from Fig. 2 as regards the vertical surface. It is hereby possible to remove the card, after it is marked, from the apparatus by means of the thumb and the forefinger.

The operation of the apparatus will be readily understood. When the car shaft is entirely supported by the spring 3, the projection of the indicating member has been lowered a distance equal to the compression of the spring, which in its turn is dependent upon the weight bearing on the screw spindle. After a card has been introduced into the slot, the knob 17 is pressed in so that the plate 13 is turned about the shaft 12 and the card 14 is pressed against the projection 10. The card is thereby provided with a mark at a place which is always the same for a certain weight. Is the weight heavier, then the mark is impressed lower; is it lighter then the card is marked at a higher point.

The card may be provided with numerals indicating the weight, bearing on the jack, when the mark appears there.

In the simple manner indicated an unobjectionable and permanent indication of the weight of a car weighed by means of the weighing jack is obtained.

I claim as my invention:

1. A weighing jack for determining the wheel pressure of vehicles, comprising, a movable head, a spring for supporting and for controlling movement of the head, a marking device movable with the head, a card holding device associated with the marking device, and means for causing the marking device to mark a card in the card holding device, the mark on the card indicating the wheel pressure of a vehicle supported by the movable head.

2. A weighing jack according to claim 1, said card holding device comprising a chamber connected with the jack, a slotted die rockably mounted in the chamber for receiving the card, and means for pressing the card against the said marking device.

3. A weighing jack comprising, a movable head a marking member controlled by the head, resilient means controlling movement of the head, and a pivoted recording card holding member operatively associated with the marking member.

In testimony whereof I affix my signature.

ABRAHAM van L. van den HEUVELL.